(12) United States Patent
Lee et al.

(10) Patent No.: US 7,097,419 B2
(45) Date of Patent: Aug. 29, 2006

(54) COMMON TIP CHAMBER BLADE

(75) Inventors: Ching-Pang Lee, Cincinnati, OH (US); Wenfeng Lu, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/898,835

(22) Filed: Jul. 26, 2004

(65) Prior Publication Data

US 2006/0062671 A1    Mar. 23, 2006

(51) Int. Cl.
*F01D 5/18*    (2006.01)
(52) U.S. Cl. .................. 415/115; 415/121.2; 416/97 R
(58) Field of Classification Search ................ 415/115, 415/121.1, 121.2, 121.3, 169.1; 416/92, 416/96 R, 97 A, 97 R
See application file for complete search history.

(56) References Cited

U.S. PATENT DOCUMENTS

| | | | |
|---|---|---|---|
| 4,073,599 A | 2/1978 | Allen et al. | |
| 4,753,575 A | 6/1988 | Levengood et al. | |
| 4,820,122 A * | 4/1989 | Hall et al. | ................. 416/97 R |
| 4,992,026 A | 2/1991 | Ohtomo et al. | |
| 5,125,798 A | 6/1992 | Muth et al. | |
| 5,395,212 A | 3/1995 | Anzai et al. | |
| 5,403,159 A | 4/1995 | Green et al. | |
| 5,462,405 A * | 10/1995 | Hoff et al. | ................. 416/97 R |
| 5,564,902 A | 10/1996 | Tomita | |
| 5,660,523 A | 8/1997 | Lee | |
| 5,902,093 A | 5/1999 | Liotta et al. | |
| 6,033,181 A * | 3/2000 | Endres et al. | ............. 416/97 R |
| 6,089,826 A | 7/2000 | Tomita et al. | |
| 6,164,913 A | 12/2000 | Reddy | |
| 6,164,914 A | 12/2000 | Correia et al. | |
| 6,609,884 B1 * | 8/2003 | Harvey | ........................ 415/115 |
| 6,672,829 B1 | 1/2004 | Cherry et al. | |
| 6,874,992 B1 * | 4/2005 | Dailey | ........................ 416/96 R |
| 2002/0119045 A1 | 8/2002 | Starkweather | |

* cited by examiner

*Primary Examiner*—Edward K. Look
*Assistant Examiner*—Igor Kershteyn
(74) *Attorney, Agent, or Firm*—William S. Andes; Francis L. Conte (57) ABSTRACT

A turbine blade includes an airfoil having pressure and suction sidewalls spaced apart between opposite leading and trailing edges and interconnected by a plurality of partitions to define first and second independent cooling circuits therein. The cooling circuits have corresponding inlets in a dovetail of the blade and extend through a platform of the blade and through the airfoil to its tip. A common discharge chamber is disposed below the airfoil tip and includes a plurality of outlet holes for discharging cooling air from the circuits.

25 Claims, 4 Drawing Sheets

COMMON TIP CHAMBER BLADE

BACKGROUND OF THE INVENTION

The present invention relates generally to gas turbine engines, and, more specifically, to turbine blade cooling.

In a gas turbine engine, air is pressurized in a compressor and mixed with fuel in a combustor for generating hot combustion gases. Energy is extracted from the combustion gases in several rows or stages of turbine blades which power the compressor, and power a fan in a turbofan aircraft engine application, or power an external drive shaft in marine and industrial applications.

The high pressure turbine (HPT) includes one or more stages which first receive the hot gases from the combustor, and are typically internally cooling by channeling therethrough a portion of pressurized air bled from the compressor. Each turbine blade includes an airfoil extending radially outwardly from an integral platform and supporting dovetail. The airfoil is hollow and includes various cooling circuits therein having inlets at the base of the dovetail for receiving the bleed or cooling air.

Turbine blade cooling is crowded with various configurations of the cooling circuits therein tailored for accommodating the varying heat loads from the combustion gases over the opposite pressure and suction sides of the airfoil and between the axially opposite leading and trailing edges and the radially opposite inner root and outer tip. Each airfoil typically includes rows of film cooling holes through the sidewalls thereof which discharge the spent cooling air in corresponding thermally insulating films over the external surface of the airfoil.

The internal cooling circuits include radial channels or legs axially separated from each other by corresponding partitions or bridges which extend radially along the span of the airfoil. Dedicated cooling legs may be used directly behind the leading edge and directly in front of the trailing edge for specialized cooling thereof. The midchord region of the airfoil may also include dedicated cooling channels typically in the form of serpentine circuits having multiple radial legs which alternate the radial flow of the cooling air between the root and tip of the airfoil.

One or more serpentine cooling circuits may be used in each airfoil either combined with or independent from the cooling legs along the leading and trailing edges. The cooling circuits may also include various forms of short ribs or turbulators along the inner surface of the pressure and suction sidewalls for tripping the cooling air to increase the heat transfer thereof.

Turbine blades found in gas turbine engines are subject to the local environment in which the engine is operated. And, minimum weight of the engine is typically a paramount design objective, particularly for aircraft engines, which limits the size and complexity of the engine and associated equipment when integrated into the aircraft.

For example, operating a gas turbine engine in a dusty environment will carry dust particles through the compressor, which dust particles are also entrained in the cooling air used for the turbine blades. The cooling circuits of the turbine blades are relatively small, with small features therein, including the various rows of film cooling holes. A typical film cooling hole is about 10–15 mils in diameter and is susceptible to dust accumulation during operation.

Accordingly, it is common practice to include relatively large dust holes in the airfoil tip to permit entrained dust particles to readily exit the airfoil and minimize dust accumulation therein or in the smaller film cooling holes. A typical dust hole is about 25 to 60 mils in diameter which is several times the diameter of the small film cooling holes.

Furthermore, the tip region of the typical turbine blade also requires dedicated cooling to ensure its durability and long useful life. The typical airfoil tip is a thin flat plate which closes the radially outer end of the airfoil, and typically includes short extensions of the pressure and suction sidewalls in the form of squealer or tip ribs. The squealer ribs define an outwardly open tip cavity in which the dust holes are located for discharging the cooling air and any dust from the airfoil. The tip also typically includes several smaller cooling holes for cooling the tip itself and the adjacent squealer ribs.

Since the dust holes are typically much larger than the film cooling holes and the tip cooling holes, they themselves have little cooling efficacy and correspondingly increase the flowrate of the cooling air which must be channeled through each airfoil. Any such excess air channeled through the airfoil correspondingly decreases the overall efficiency of the gas turbine engine since the bleed air is not used in the combustion process.

Compounding this problem of the large dust holes is the typical need for multiple large dust holes in an individual turbine blade for multiple independent cooling circuits used therein. Since the pressure distribution of the combustion gases varies over the external surface of the airfoil between the leading and trailing edges and along the pressure and suction sides of the airfoil, independent cooling circuits are typically provided inside each airfoil and fed with a common pressure bleed air.

As the cooling air is channeled through the independent circuits in the airfoil it experiences pressure losses or drops between the inlet of each cooling circuit and the various outlets thereof, such as the film cooling holes along the airfoil sidewalls, trailing edge holes along the thin trailing edge, and the tip cooling holes in the airfoil tip. Each circuit and its various outlet holes are specifically designed for maintaining a suitable backflow margin at each of the outlet holes to prevent ingestion of the hot combustion gases into the airfoil during operation. Backflow margin is a primary design objective in configuring the various cooling circuits inside each turbine blade.

Accordingly, it is desired to provide an improved turbine blade for minimizing air discharge through the dust holes.

BRIEF DESCRIPTION OF THE INVENTION

A turbine blade includes an airfoil having pressure and suction sidewalls spaced apart between opposite leading and trailing edges and interconnected by a plurality of partitions to define first and second independent cooling circuits therein. The cooling circuits have corresponding inlets in a dovetail of the blade and extend through a platform of the blade and through the airfoil to its tip. A common discharge chamber is disposed below the airfoil tip and includes a plurality of outlet holes for discharging cooling air from the circuits.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
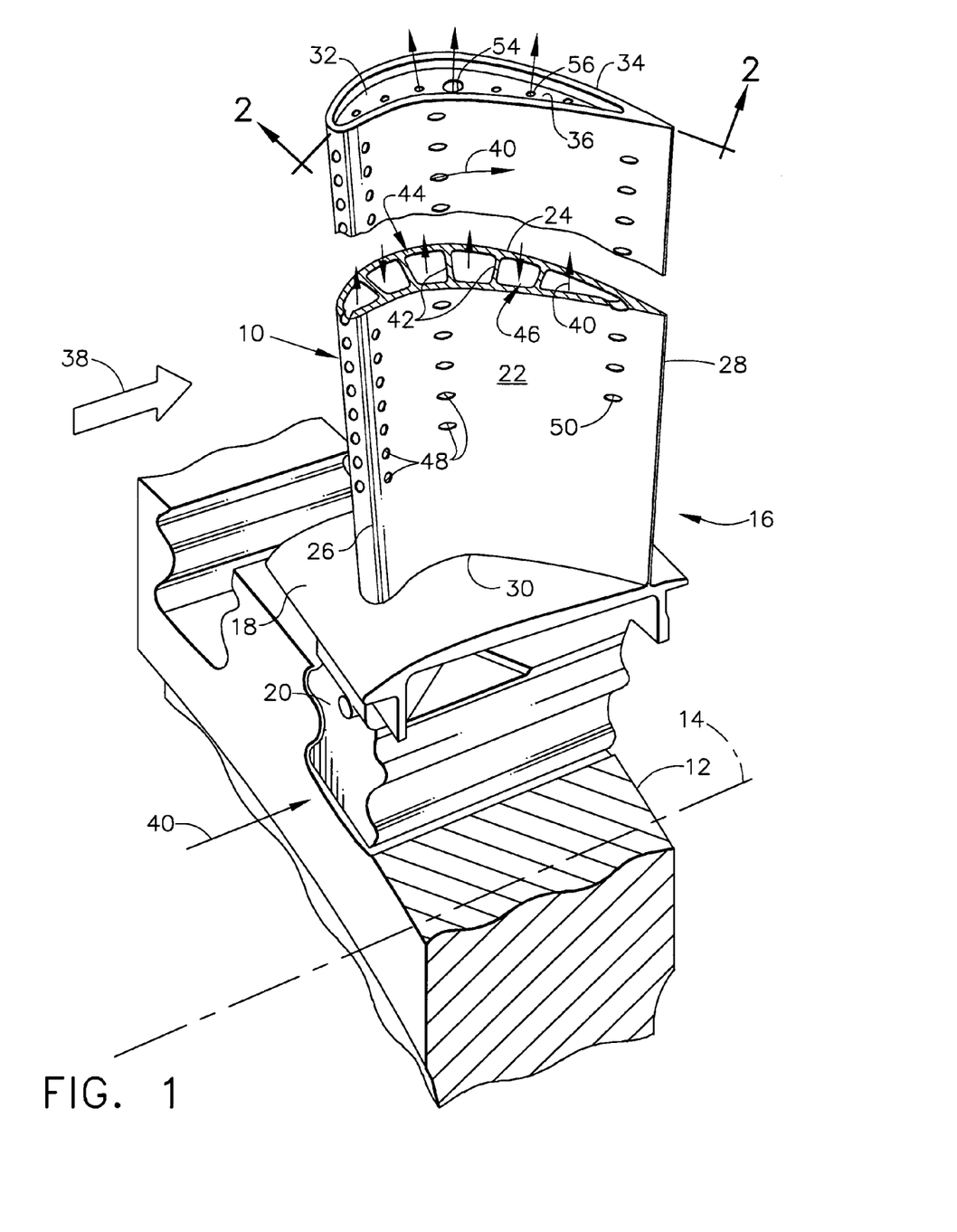
FIG. 1 is a partly sectional, isometric view of an exemplary turbine rotor blade in a gas turbine engine extending radially outwardly from a supporting rotor disk shown in part.

Illustrated in FIG. 1 is an exemplary turbine rotor blade 10 extending radially outwardly from a supporting rotor disk 12 having an axial centerline axis 14. The turbine blade 10 is one of several in a row of blades in the exemplary second stage of a high pressure turbine in a gas turbine engine configured either as an aircraft engine, or a marine or industrial engine for powering a ship or electrical generator for example.

The turbine blade 10 includes an airfoil 16, platform 18, and dovetail 20 integrally joined together in a typical unitary casting. The airfoil includes a generally concave pressure sidewall 22 and a circumferentially opposite, generally convex suction sidewall 24 integrally joined together at axially or chordally opposite leading and trailing edges 26,28. The two sidewalls extend in radial span from an inner root 30 at the platform 18 to an opposite, radially outer tip 32.

The blade tip 32 is in the form of a thin flat plate which closes the radially outer end of the airfoil, and the two sidewalls 22,24 preferably extend radially outwardly from the tip 32 along corresponding small squealer tip ribs 34 to collectively define a tip cap having an external tip cavity 36.

During operation in the gas turbine engine, hot combustion gases 38 are discharged from the combustor (not shown) and flow axially aft around the individual turbine airfoils 16, with the inner platforms 18 thereof defining the radially inner boundary for the combustion gases. Furthermore, each airfoil is hollow and receives through the blade dovetails pressurized cooling air 40 bled from the compressor (not shown) for internally cooling the blades.

Figure 2:
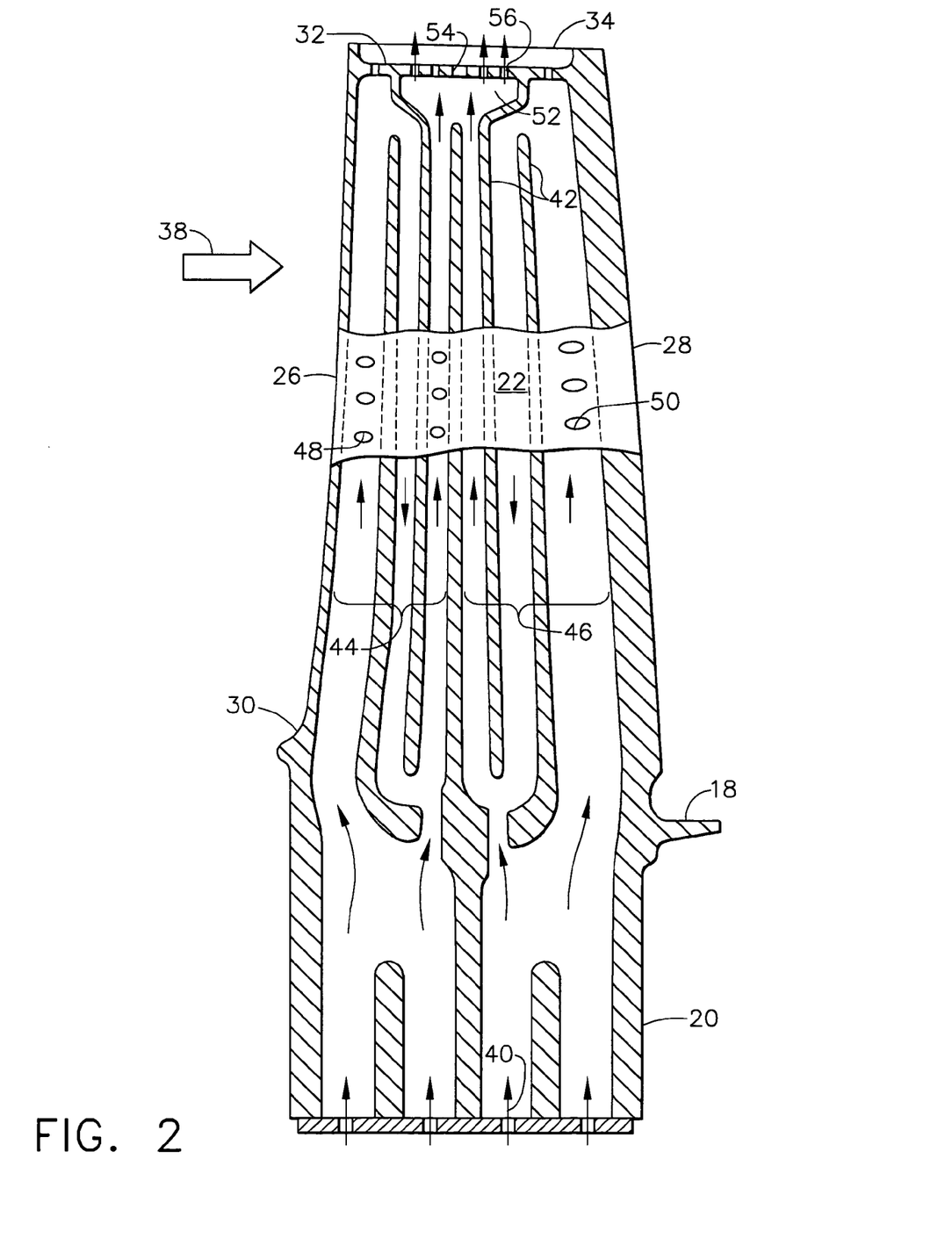
FIG. 2 is an elevational sectional view of the turbine blade illustrated in FIG. 1 and taken along line 2—2.

Referring to FIGS. 1 and 2, the two sidewalls 22,24 are spaced laterally or circumferentially apart between the leading and trailing edges 26,28 of the airfoil and are locally interconnected by a plurality of preferably imperforate ribs or partitions 42 integrally joined with the two sidewalls in the common casting. The several partitions are used to define multiple internal cooling circuits inside the airfoil such as the first and second independent, serpentine cooling circuits 44,46 illustrated.

Each of the cooling circuits includes a corresponding inlet in the lower base of the dovetail 20 for receiving the cooling air 40 from the compressor. Each dovetail 20 has a conventional configuration typically including multiple tangs or lobes which extend axially for retention in corresponding axial dovetail slots formed in the perimeter of the supporting rotor disk 12. The cooling circuits extend from the dovetail and through the platform 18 and airfoil 16 in parallel flow between the root and tip of the airfoil.

The cooling circuits 44,46 may have any conventional configuration, such as the exemplary three-pass serpentine circuits illustrated. Accordingly, the first circuit 44 includes three radial legs or channels extending in span between the airfoil root and the outer tip 32. The three legs are defined by the first three radial partitions 42 correspondingly extending radially inwardly or outwardly with a 180 degree bends or turns for reversing direction of the cooling air in each subsequent leg.

The second circuit 46 correspondingly includes three legs or channels extending in span between the inner root and the outer tip 32. The three legs of the second circuit 46 are similarly defined by the last three radial partitions 42 which extend radially inwardly or radially outwardly with corresponding 180 degree turns or bends for reversing direction of the cooling air through the second circuit.

The various channels of the cooling circuits may include conventional turbulators (not shown) on the inner surfaces of the pressure and suction sidewalls for enhancing heat transfer by locally tripping the cooling air as it flows radially through the airfoil. In this way, the airfoil is cooled by convection as the cooling air is channeled through the multiple legs of the serpentine circuits for cooling the different portions of the airfoil as required to accommodate the different heat loads of the combustion gases outside the airfoil.

The spent cooling air from the circuits may be discharged through various conventional outlets, such as several rows of small film cooling holes 48 inclined through the sidewalls of the airfoil, as well as through small trailing edge cooling holes 50 extending axially aft through the thin trailing edge of the airfoil in any conventional configuration.

Figure 3:
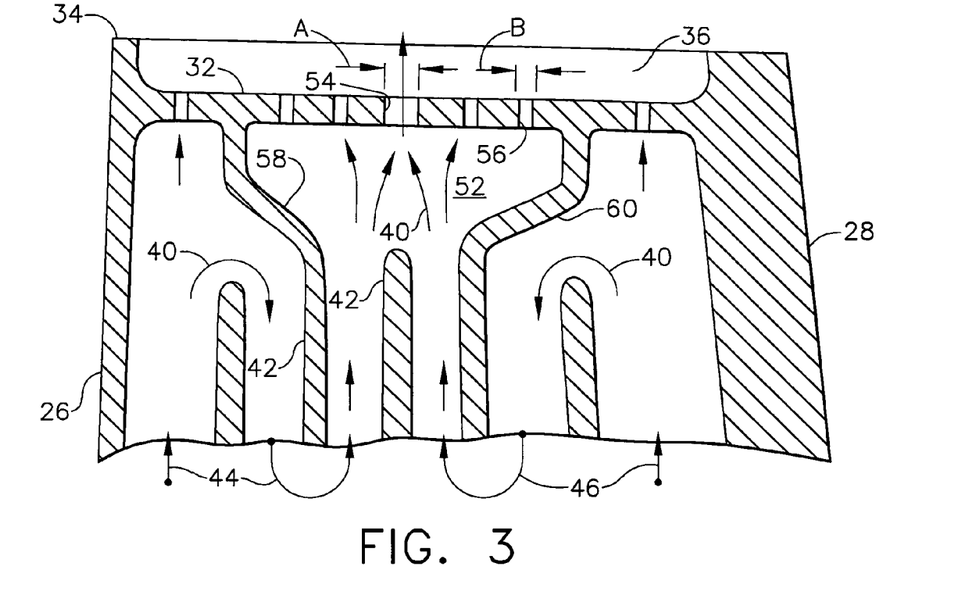
FIG. 3 is an enlarged sectional view of the tip region of the blade illustrated in FIG. 2.

As best illustrated in FIG. 3, the airfoil further includes a common discharge or outlet chamber 52 disposed directly below the airfoil tip 32 in flow communication with the two cooling circuits 44,46. The tip 32 correspondingly includes a plurality of differently sized outlet holes 54,56 for discharging the cooling air 40 from the two circuits 44,46.

More specifically, the airfoil tip includes a single large dust hole 54 with a remaining plurality of smaller cooling holes 56. The single dust hole 54 may be cylindrical with a diameter A, and each of the smaller cooling holes 56 may also be cylindrical with identical diameters B.

The tip cooling holes 56 may have any conventional size which is typically relatively small for locally cooling the tip 32 around each hole for minimizing cooling air requirements. For example, the diameter B of the tip cooling holes 56 may be about 10 to about 20 mils.

In contrast, the single dust hole 54 has a diameter A which is about twice the diameter B of the cooling holes 56, and may be in the exemplary range of about 25 to about 60 mils. Accordingly, the single dust hole 54 has about four times the discharge flow area than each of the individual cooling holes 56.

In this way, the common tip chamber 52 collects the discharge air from the two cooling circuits 44,46 and discharges that air through the common dust hole 54 and tip holes 56 into the external tip cavity 36 which is disposed in flow communication therewith. The single dust hole may therefore be used for discharging air from the two cooling circuits, and thereby discharging any dust contained therein for minimizing dust accumulation inside the airfoil.

Accordingly, instead of using two separate and independent dust holes for two separate and independent cooling circuits, the two cooling circuits remain independent from each other but discharge into the common outlet chamber 52 from which the collective dust in the air may be discharged through the single dust hole 54. The single dust hole 54 is therefore used for both cooling circuits, and correspondingly reduces the cooling air requirements for the turbine blade compared with a conventional turbine blade having multiple large dust holes for multiple cooling circuits therein.

An additional advantage of the common tip chamber 52 is the corresponding ability to tailor the location of the remaining small tip cooling holes 56 for cooling the entire tip 32 independently of the single dust hole 54. The tip chamber 52 provides a locally large plenum in which the pressurized spent cooling air 40 may be collected while maintaining sufficient backflow margin with the combustion gases which flow over the external tip cavity 36 during operation.

Each of the small tip cooling holes 56 limits or meters the amount of cooling air discharged therethrough and they collectively discharge the cooling air relative to the single large dust hole 54. Using the single dust hole 54 instead of two or more large dust holes in combination with the small tip cooling holes 56 improves the cooling configuration of the tip cap region of the blade.

As indicated above, the two cooling circuits 44,46 illustrated in FIGS. 2 and 3 may have various conventional configurations such as the three-pass serpentine cooling circuits illustrated. For example, the corresponding last legs of the two circuits 44,46 terminate in the common chamber 52 directly below the airfoil tip.

In the exemplary embodiment illustrated in FIGS. 2 and 3, five radial partitions 42 are used to divide the airfoil along its chord and define the corresponding six legs of the two cooling circuits 44,46. The middle or midchord partition is disposed chordally between the leading and trailing edges 26,28 near the middle of the airfoil. The first serpentine cooling circuit 44 is correspondingly disposed between the middle partition 42 and the leading edge 26, and the second serpentine cooling circuit 46 is disposed between the middle partition and the trailing edge 28.

The middle partition illustrated in FIG. 3 is the third partition of the five partitions disposed between the leading and trailing edges 26,28. These five partitions in turn correspondingly define six radial channels or legs of the two cooling circuits inside the airfoil. The first leg is disposed directly behind the leading edge 26 and the sixth leg is disposed directly in front of the trailing edge 28.

In the exemplary configuration illustrated in FIGS. 2 and 3 the last or third leg of the first cooling circuit 44 is disposed along the forward side of the middle or third partition 42, and correspondingly the last leg of the second cooling circuit 46 is disposed along the opposite aft side of the middle partition as the fourth leg inside the airfoil.

Correspondingly, the first leg of the first circuit 44 is disposed directly behind the leading edge 26 and channels its flow aft into the second leg located between the first and third legs. The first leg of the second circuit 46 extends directly behind the trailing edge 28 and channels its flow forwardly into the second channel of the serpentine circuit which occupies the fifth leg location inside the airfoil.

In this way, the two three-pass serpentine circuits 44,46 have their respective inlet channels along the leading and trailing edges 26,28 of the airfoil, and receive their inlet air from corresponding inlets in the base of the dovetail as illustrated in FIG. 2. The first serpentine circuit 44 channels the cooling air aft to the midchord of the airfoil, whereas the second serpentine circuit 46 channels its air forward to the midchord of the airfoil. The two last legs of the two circuits discharge their spent cooling air into the common tip chamber 52 as indicated above.

As shown in FIG. 2, the first and fifth partitions may have local interruptions at their bases next to the common middle or third partition for permitting some of the inlet air from the dovetail to re-energize the cooling air being discharged through the last legs of the two circuits.

As best illustrated in FIG. 3, the first circuit 44 preferably includes a forward bend or bridge 58 extending radially inwardly from the tip 32 near the leading edge of the airfoil to integrally join the outer end of the second partition 42 which bounds the last leg of the first circuit. Correspondingly, the second cooling circuit 46 further includes an aft bend or bridge 60 extending radially inwardly from the airfoil tip 32 near the trailing edge to the outer end of the fourth partition 42 which bounds the last leg of the second circuit. The two bridges 58,60 are spaced chordally apart from each other and define the forward and aft ends of the common chamber 52 which chordally straddles the middle partition 42.

In this way, the two bridges 58,60 are integral extensions of the second and fourth partitions 42 which extend to the tip 32 and separate the first two legs of each of the two circuits from their respective last legs. The common outlet chamber 52 is relatively large for receiving the collective discharge flow from the two circuits. And, each of the bridges 58, 60 is inclined or oblique with the flat tip 32 to correspondingly define the 180 degree outer turns or bends between the first two legs of the two circuits.

The inclined bridges 58,60 may be used to increase the efficiency of turning of the cooling air between the corresponding first and second legs of the two circuits directly below the radially outer tip of the airfoil. Furthermore, the airfoil tip may include corresponding ones of the tip cooling holes 56 outboard of the respective bridges 58,60 and radially in line with the corresponding first legs of the two circuits for directly discharging a portion of the cooling air into the tip cavity 36 directly adjacent the corresponding leading and trailing edges of the airfoil.

Correspondingly, the inclined bridges 58,60 increase the size of the common tip chamber 52 and increase the available area in the tip 32 directly thereabove for introducing a suitable number of the small tip cooling holes 56 along with the common large dust hole 54.

Figure 4:
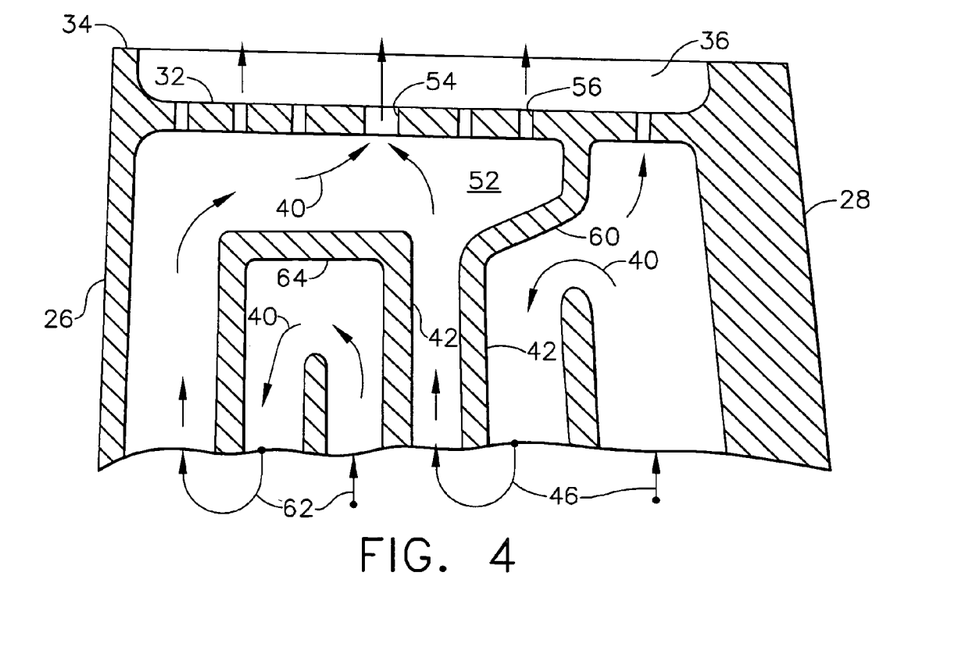
FIG. 4 is an enlarged sectional view of the tip region of the blade illustrated in FIG. 2 in accordance with an alternate embodiment.

As indicated above, the internal cooling circuits of the airfoil may have various configurations which discharge their spent cooling air into the common tip chamber 52. FIG. 4 illustrates one modification of the airfoil which includes a substantially identical second cooling circuit 46, shown in part schematically, and corresponding aft bridge 60 defining the aft portion of the common tip chamber 52. However, in this embodiment the first serpentine circuit, designated 62, is configured oppositely to the corresponding first circuit 44 illustrated in FIG. 3 using substantially the same first three partitions 42.

In the embodiment illustrated in FIG. 4, the last leg of the first circuit 62 is now disposed directly behind the leading edge 26 remote from the forward side of the middle partition 42. Instead, the first leg of the first circuit 62 extends directly along the forward side of the middle partition, with the second leg of this circuit being disposed between the first two partitions.

The embodiment illustrated in FIG. 4 includes a different form of the forward bridge, designated 64, which is spaced radially inwardly from the tip 32 and generally parallel therewith. The forward bridge 64 interconnects the radially outer end of the middle partition 42 with the radially outer end of the alternate or first partition of the first circuit 62.

In this way, the first and third partitions are joined together by the forward bridge 64 to define the first turn or bend of the first circuit 62 between the first and second legs thereof, which are correspondingly located in the third and second channels of the airfoil. The last leg of the first cooling circuit 62 is located in the first channel of the airfoil and discharges the spent cooling air into the forward end of the common tip chamber 52 which is now defined in forward part above the forward bridge 64 and in aft part by the aft bridge 60 repeated from the first embodiment.

The common chamber 52 again includes the single dust hole 54 and the smaller tip cooling holes 56 in a suitable distribution across the tip for maximizing cooling effectiveness thereof.

Figure 5:
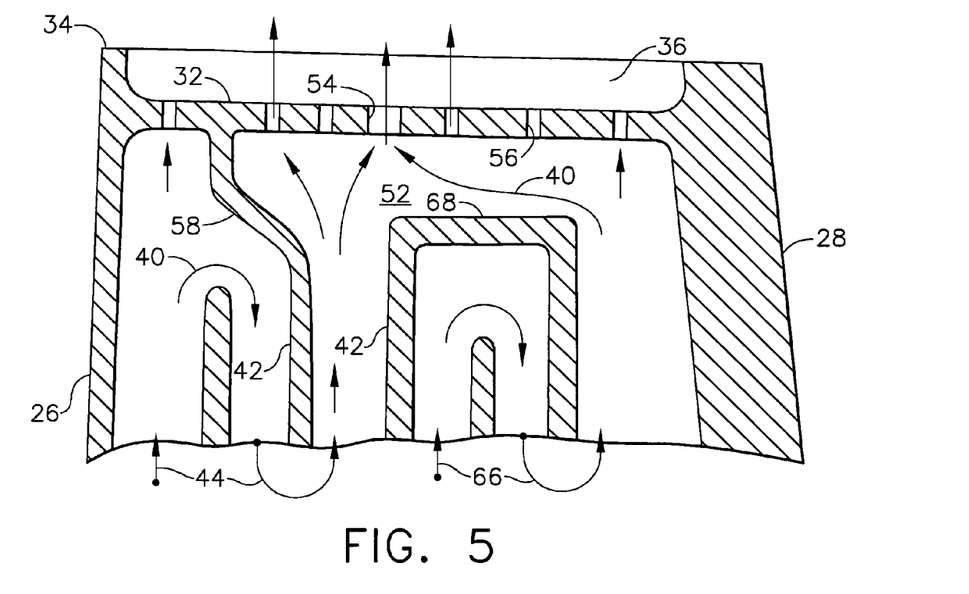
FIG. 5 is an enlarged sectional view of the tip region of the blade illustrated in FIG. 2 in accordance with an alternate embodiment.

FIG. 5 illustrates yet another modification of the cooling circuits inside the airfoil. The first serpentine circuit 44 and forward bridge 58 are substantially identical to those found in the first embodiment illustrated in FIG. 3.

However, the second serpentine cooling circuit, designated 66, is configured oppositely to those illustrated in FIGS. 3 and 4. In this embodiment, the last leg of the second circuit 66 is disposed directly in front of the trailing edge 28 remote from the aft side of the middle or third partition 42.

Correspondingly, the first leg of the second circuit 66 is disposed along the aft side of the middle partition followed in turn by the second and third legs of the second circuit, which correspondingly occupy the fourth, fifth, and sixth channels of the airfoil.

In the modification illustrated in FIG. 5, the aft bridge, designated 68, is spaced radially inwardly from the tip 32 near the trailing edge, and interconnects the middle or third partition 42 with the alternate or last partition of the second circuit 66. In this way, the aft bridge 68 is disposed parallel with the tip 32 and defines the first turn or bend between the first and second legs of the second circuit 66. And, the aft bridge 68 defines in part the aft portion of the common tip chamber 52, with the forward portion thereof being defined by the inclined forward bridge 58.

In this embodiment illustrated in FIG. 5, the two serpentine circuits 44,66 have last legs which again discharge the spent cooling air into the common tip chamber 52 for discharge through the single dust hole 54 and the several tip cooling holes 56 which may be suitably distributed through the tip 32 for maximizing cooling effectiveness in the blade tip.

Figure 6:
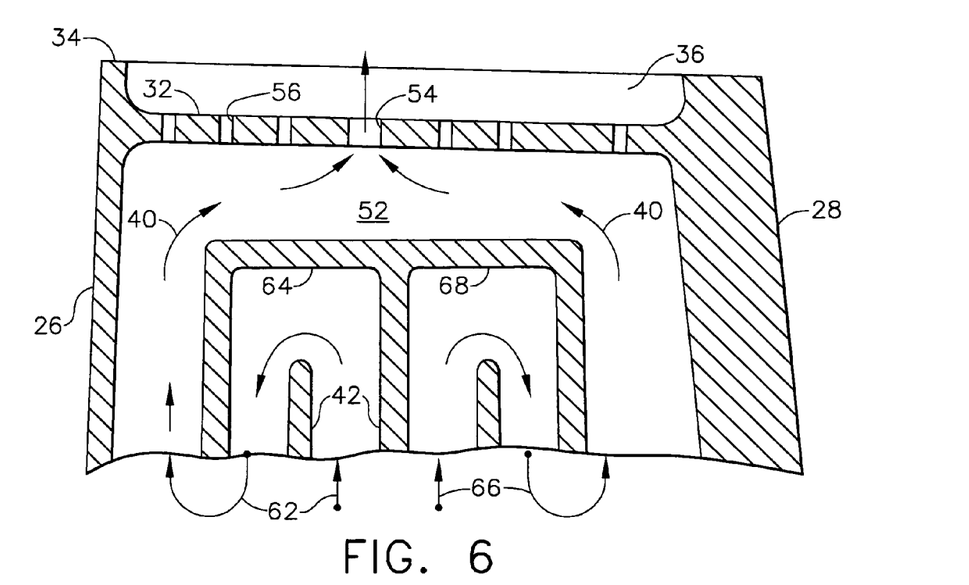
FIG. 6 is an enlarged sectional view of the tip region of the blade illustrated in FIG. 2 in accordance with an alternate embodiment.

FIG. 6 illustrates yet another embodiment of the serpentine cooling circuits which is a combination of the first cooling circuit 62 from FIG. 4 and the second cooling circuit 66 from FIG. 5 along with their corresponding parallel forward and aft bridges 64,68, used instead of the inclined bridge 58,60.

In this embodiment, the last leg of the first circuit 62 is again disposed directly behind the leading edge 26 remote from the forward side of the middle partition 42. And, the last leg of the second circuit 66 is disposed directly in front of the trailing edge 28 remote from the aft side of the middle partition.

Correspondingly, the first leg of the first circuit 62 extends directly along the forward side of the middle partition, and the first leg of the second circuit 66 extends directly along the aft side of the middle partition.

The two bridges 64,68 are coplanar with each other and parallel with the airfoil tip 32 to define the common tip chamber 52 therebetween. The two bridges 64,68 integrally interconnect the radially outer ends of the first, third, and fifth partitions, with the outer ends of the second and fourth partitions being spaced radially inwardly to define the corresponding first turns or bends of the two circuits 62,66.

The common tip chamber illustrated in FIG. 6 now extends the full chordal extent of the airfoil between the leading and trailing edges and directly below the tip 32. The common chamber 52 is also disposed directly above the forward and aft bridges and receives the spent cooling air from the two serpentine circuits 62,66 from their last legs along the corresponding leading and trailing edges, respectively.

The airfoil tip 32 again includes the single dust hole 54 suitably positioned within the distributed tip cooling holes 56 for tailoring the cooling effectiveness of the spent cooling air at the airfoil tip.

The various embodiments of the serpentine cooling circuits illustrated in FIGS. 3–6 permit tailoring of the internal cooling of the airfoil along the leading and trailing edges and the pressure and suction sides thereof. In all four embodiments, the common tip chamber 52 is provided directly below the tip 32 and includes the single dust hole 54 and the smaller tip cooling holes 56. The different forms of the forward and aft bridges which bound the common chamber 52 permit tailoring of the cooling of the airfoil tip itself in conjunction with different configurations of the internal cooling circuits.

Although two multi-pass serpentine cooling circuits have been illustrated in the various embodiments disclosed above, additional cooling circuits may also be incorporated into the airfoil and may include dedicated single-leg cooling channels along either the leading or trailing edge of the airfoil. Various forms of the serpentine cooling circuits may also be used all sharing the common benefit of using a single dust hole for multiple independent cooling circuits. And, various forms of the tip cap may be used, including pressure-side tip shelves, with normal or inclined squealer ribs.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

We claim:

1. A turbine blade comprising:

an airfoil, platform, and dovetail integrally joined together;

said airfoil including opposite pressure and suction sidewalls joined together at opposite leading and trailing edges and extending in span from a root at said platform to an opposite tip;

said sidewalls being spaced apart between said leading and trailing edges and interconnected by a plurality of partitions to define first and second independent serpentine cooling circuits having corresponding inlets in said dovetail and extending through said platform and airfoil to a common discharge chamber disposed below said tip; and said tip includes a single dust hole and a remaining plurality of smaller cooling holes for discharging cooling air from said circuits.

2. A blade according to claim 1 wherein:

said airfoil further includes a middle partition disposed chordally between said leading and trailing edges;

said first circuit is disposed between said middle partition and said leading edge, and said second circuit is disposed between said middle partition and said trailing edge; and each of said serpentine first and second circuits includes a plurality of legs extending in span between said airfoil root and tip, with corresponding last legs thereof terminating in said common chamber.

3. A blade according to claim 2 wherein said last leg of said first circuit is disposed along a forward side of said middle partition, and said last leg of said second circuit 46 is disposed along an opposite aft side of said middle partition.

4. A blade according to claim 3 wherein said first circuit further includes a forward bridge extending inwardly from said tip to one of said partitions bounding said last leg thereof, and said second circuit further includes an aft bridge extending inwardly from said tip to one of said partitions bounding said last leg thereof to define said common chamber disposed above said middle partition.

5. A blade according to claim 2 wherein said last leg of said first circuit is disposed behind said leading edge remote from a forward side of said middle partition, and said last leg of said second circuit is disposed along an opposite aft side of said middle partition.

6. A blade according to claim 5 wherein said first circuit further includes a forward bridge spaced inwardly from said tip and interconnecting said middle partition with an alternate partition of said first circuit, and said second circuit further includes an aft bridge extending inwardly from said tip to one of said partitions bounding said last leg thereof to define said common chamber above said forward bridge.

7. A blade according to claim 2 wherein said last leg of said first circuit is disposed along a forward side of said middle partition, and said last leg of said second circuit is disposed in front of said trailing edge remote from an opposite aft side of said middle partition.

8. A blade according to claim 7 wherein said first circuit further includes a forward bridge extending inwardly from said tip to one of said partitions bounding said last leg thereof, and said second circuit further includes an aft bridge spaced inwardly from said tip and interconnecting said middle partition with an alternate partition of said second circuit to define said common chamber above said aft bridge.

9. A blade according to claim 2 wherein said last leg of said first circuit is disposed behind said leading edge remote from a forward side of said middle partition, and said last leg of said second circuit is disposed in front of said trailing edge remote from an opposite aft side of said middle partition.

10. A blade according to claim 9 wherein said first circuit further includes a forward bridge spaced inwardly from said tip and interconnecting said middle partition with an alternate partition of said first circuit, and said second circuit further includes an aft bridge spaced inwardly from said tip and interconnecting said middle partition with an alternate partition of said second circuit to define said common chamber above both said forward and aft bridges.

11. A turbine blade comprising:

an airfoil, platform, and dovetail integrally joined together;

said airfoil including opposite pressure and suction sidewalls joined together at opposite leading and trailing edges and extending in span from a root at said platform to an opposite tip;

said sidewalls being spaced apart between said leading and trailing edges and interconnected by a plurality of imperforate partitions to define first and second independent cooling circuits having corresponding inlets in said dovetail and extending through said platform and airfoil, and having corresponding outlet channels terminating without obstruction in a common discharge chamber disposed below said tip; and said tip including a plurality of outlet holes for discharging cooling air from said circuits.

12. A turbine blade comprising:

an airfoil, platform, and dovetail integrally joined together;

said airfoil including opposite pressure and suction sidewalls joined together at opposite leading and trailing edges and extending in span from a root at said platform to an opposite tip;

said sidewalls being spaced apart between said leading and trailing edges and interconnected by a plurality of partitions to define first and second independent cooling circuits having corresponding inlets in said dovetail and extending through said platform and airfoil to a common discharge chamber disposed below said tip; and said tip including a single dust hole and a remaining plurality of smaller cooling for discharging cooling air from said circuits holes.

13. A blade according to claim 12 wherein said pressure and suction sidewalls extend outwardly from said tip along corresponding tip ribs to define an external tip cavity disposed in flow communication with said dust hole and tip cooling holes.

14. A blade according to claim 13 wherein said first circuit comprises a serpentine cooling circuit having a plurality of legs extending in span between said airfoil root and tip, with a last leg thereof terminating in said common chamber.

15. A blade according to claim 14 wherein said second circuit comprises a serpentine cooling circuit having a plurality of legs extending in span between said airfoil root and tip, with a last leg thereof terminating in said common chamber.

16. A blade according to claim 15 wherein:

said airfoil further includes a middle partition disposed chordally between said leading and trailing edges; and said first circuit is disposed between said middle partition and said leading edge, and said second circuit is disposed between said middle partition and said trailing edge.

17. A blade according to claim 16 wherein said last leg of said first circuit is disposed along a forward side of said middle partition, and said last leg of said second circuit is disposed along an opposite aft side of said middle partition.

18. A blade according to claim 16 wherein said last leg of said first circuit is disposed behind said leading edge remote from a forward side of said middle partition, and said last leg of said second circuit is disposed along an opposite aft side of said middle partition.

19. A blade according to claim 16 wherein said last leg of said first circuit is disposed along a forward side of said middle partition, and said last leg of said second circuit is disposed in front of said trailing edge remote from an opposite aft side of said middle partition.

20. A blade according to claim 16 wherein said last leg of said first circuit is disposed behind said leading edge remote from a forward side of said middle partition, and said last leg of said second circuit is disposed in front of said trailing edge remote from an opposite aft side of said middle partition.

21. A blade according to claim 16 wherein said first circuit 44 further includes a forward bridge extending inwardly from said tip to one of said partitions bounding said last leg thereof, and said second circuit further includes an aft bridge extending inwardly from said tip to one of said partitions bounding said last leg thereof to define said common chamber disposed above said middle partition.

22. A blade according to claim 16 wherein said first circuit further includes a forward bridge spaced inwardly from said tip and interconnecting said middle partition with an alternate partition of said first circuit, and said second circuit further includes an aft bridge extending inwardly from said tip to one of said partitions bounding said last leg thereof to define said common chamber above said forward bridge.

23. A blade according to claim 16 wherein said first circuit further includes a forward bridge extending inwardly from said tip to one of said partitions bounding said last leg thereof, and said second circuit further includes an aft bridge spaced inwardly from said tip and interconnecting said middle partition with an alternate partition of said second circuit to define said common chamber above said aft bridge.

24. A blade according to claim 16 wherein said first circuit further includes a forward bridge spaced inwardly from said tip and interconnecting said middle partition with an alternate partition of said first circuit, and said second circuit further includes an aft bridge spaced inwardly from said tip and interconnecting said middle partition with an alternate partition of said second circuit to define said common chamber above both said forward and aft bridges.

25. A blade according to claim 16 wherein said dust hole is above twice the diameter of said cooling holes.

\* \* \* \* \*

UNITED STATES PATENT AND TRADEMARK OFFICE
CERTIFICATE OF CORRECTION

PATENT NO. : 7,097,419 B2
APPLICATION NO. : 10/898835
DATED : August 29, 2006
INVENTOR(S) : Ching-Pang Lee et al.

It is certified that error appears in the above-identified patent and that said Letters Patent is hereby corrected as shown below:

Column 10, claim 12, at line 24 thereof, insert -- holes -- after first occurrence of "cooling," and at line 25 thereof delete "holes" therefrom.

Signed and Sealed this

Ninth Day of January, 2007

JON W. DUDAS
*Director of the United States Patent and Trademark Office*